United States Patent [19]

Sanderson

[11] Patent Number: 5,642,608
[45] Date of Patent: Jul. 1, 1997

[54] SHAFT STRUCTURE FOR A COTTON HARVESTER DOFFER COLUMN

[75] Inventor: Leon Franklin Sanderson, Des Moines, Iowa

[73] Assignee: Deere & Company, Moline, Ill.

[21] Appl. No.: 551,492

[22] Filed: Nov. 1, 1995

[51] Int. Cl.⁶ .................................................. A01D 46/08
[52] U.S. Cl. .................................. 56/28; 56/41; 56/50
[58] Field of Search ............................... 56/28, 40, 41, 56/44, 36, 50, 276, 13.5, 15.5, 45, 46, 47, 48; 403/13

[56] References Cited

U.S. PATENT DOCUMENTS

| | | |
|---|---|---|
| 1,747,566 | 2/1930 | Berry .................................... 56/41 X |
| 2,729,930 | 1/1956 | Walker ..................................... 56/41 |
| 2,738,636 | 3/1956 | Walker ..................................... 56/41 |
| 2,741,891 | 4/1956 | Knoth ...................................... 56/41 |
| 2,770,086 | 11/1956 | Knoth ...................................... 56/41 |
| 3,224,178 | 12/1965 | Kennedy ................................... 56/41 |
| 3,292,352 | 12/1966 | Shaw ....................................... 56/41 |
| 3,333,406 | 8/1967 | Parkerton ................................. 56/41 |
| 3,411,278 | 11/1968 | Grant ...................................... 56/41 |
| 3,422,607 | 1/1969 | Tracy et al. ............................. 56/41 |
| 3,469,379 | 9/1969 | Hubbard ................................... 56/41 |
| 3,894,283 | 7/1975 | Schonstedt ............................... 324/3 |
| 3,971,197 | 7/1976 | Batzer et al. ............................ 56/41 |
| 4,226,021 | 10/1980 | Hoff ...................................... 30/276 |
| 4,326,369 | 4/1982 | Schillerstrom et al. ................... 56/41 |
| 4,520,721 | 6/1985 | Decoene .................................. 100/88 |
| 4,819,415 | 4/1989 | Engelstad et al. ........................ 56/41 |
| 4,928,459 | 5/1990 | Thedford et al. ...................... 56/41 X |
| 5,412,930 | 5/1995 | Sheldon, Jr. ............................ 56/44 |
| 5,557,911 | 9/1996 | Sanderson et al. ....................... 56/41 |

*Primary Examiner*—Terry Lee Melius
*Assistant Examiner*—Victor Batson

[57] ABSTRACT

Cylindrical spacers having axially ribbed inner portions and an expanded circumference are located on the doffer shaft of a cotton harvester doffer column to support the doffers in vertically spaced relation and improve shaft strength and bend and vibration resistance. The spacer rib ends have doffer contacting surfaces to bite into the doffer and provide a keying function for enhanced doffer rotational retention.

16 Claims, 1 Drawing Sheet

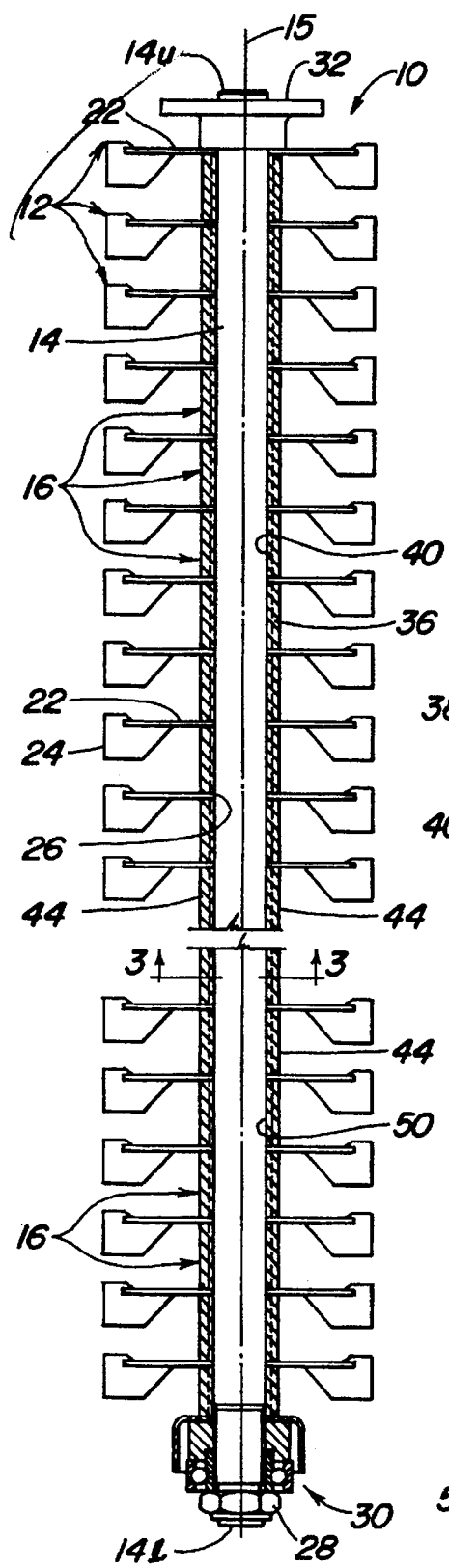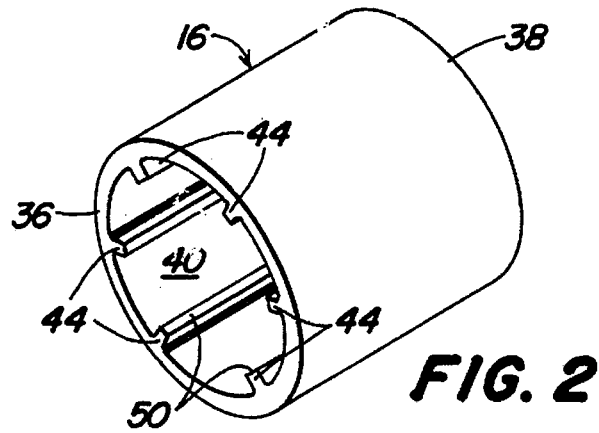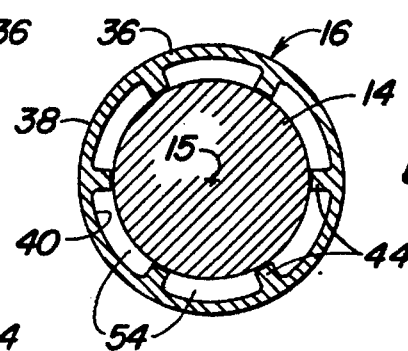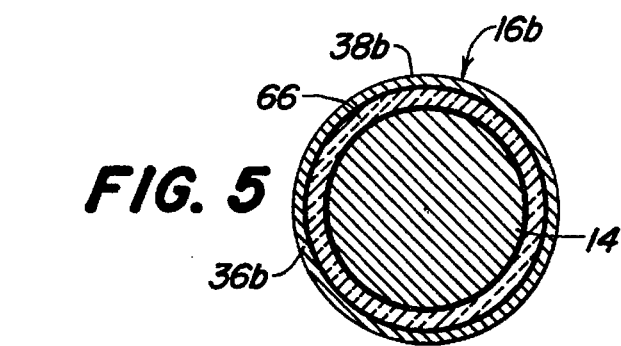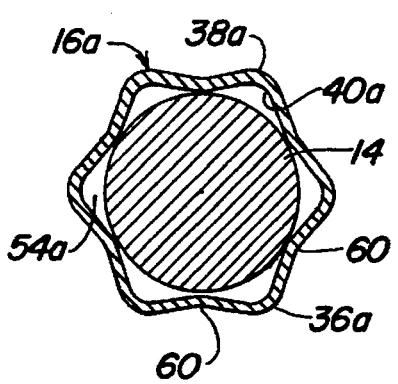

SHAFT STRUCTURE FOR A COTTON HARVESTER DOFFER COLUMN

BACKGROUND OF THE INVENTION

1) Field of the Invention

The present invention relates generally to cotton harvesters and, more specifically, to cotton picker doffer column structure having increased strength and doffer support.

2) Related Art

Cotton harvesters of the spindle type such as the John Deere model 9960 Cotton Picker include row units with upright picker drums having spindle bars defining rows of picking spindles. Adjacent each of the picker drums is a doffer column with a plurality of doffers supported on a shaft for rotation directly above the rows of spindles to unwrap cotton from the spindles and direct the cotton towards conveying structure on the row unit. The doffers have apertured metal support plates which are horizontally disposed and vertically spaced on a doffer shaft using thin walled cylindrical spacers. The spacers have an inner diameter approximately equal to but slightly larger than the outer diameter of the shaft and are slid over the shaft between doffers. A doffer column nut at one end of the column sandwiches the support plates between adjacent spacers. Frictional engagement between the plates and the spacers causes the doffers to rotate with the doffer shaft.

Several problems exist with conventional doffer columns with the cylindrical spacers. The small, radially inward contact area between the spacers and the support plates of the doffers limits torque, and wear of the spacers and the plates can occur if the doffers slip. Doffer vibration and instability can also occur, particularly when doffer speeds and/or doffer column lengths are increased and the typical doffer operating speed approaches the critical speed. The relatively small radius doffer shaft is subject to heavy loads and off-axis bending which stresses the entire column and the bearings supporting the column. The spacers provide some shaft reinforcement which is limited because of the small spacer radius.

BRIEF DESCRIPTION OF THE INVENTION

It is therefore an object of the present invention to provide an improved doffer column for a cotton harvester row unit. It is another object to provide such a column which overcomes most or all of the above-mentioned problems.

It is another object of the present invention to provide an improved doffer column structure which is simple and inexpensive in construction and which provides better doffer retention than at least most previously available structures. It is another object to provide such a structure which has increased column strength without a substantial increase in column weight.

It is still another object of the invention to provide an improved doffer spacer for a cotton picker doffer column. It is another object to provide such a spacer which increases the strength and bend resistance of the doffer column. It is a further object to provide such a spacer which raises the natural frequency of the doffer column so that the critical speed of the column is increased to provide improved productivity.

It is yet another object of the invention to provide an improved doffer spacer for a cotton picker doffer column which is light in weight and yet provides better doffer retention and gripping characteristics than at least most previously available spacers. It is still another object to provide such a spacer which increase the strength and bending resistance of the doffer column.

A doffer column structure constructed in accordance with the teachings of the present invention includes a plurality of doffers spaced on a conventional doffer column shaft by spacers having interior hollow portions for increasing spacer diameter without significantly increasing weight over that of conventional small-radius, thin-walled spacers. In the preferred embodiment, the spacers have a cylindrical outermost portion to maximize the area of the radially outermost doffer plate gripping portions for better leverage and reduced slippage. Centering members such as axially extending ribs have innermost surfaces which slidably mount over the column shaft and center the spacers on the shaft. Open areas between the ribs decrease weight of the spacers without a substantial decrease in spacer strength. The ends of the ribs bear against the doffer plates to help provide a firm grip between the spacers and the doffers. The increased diameter of the radially outermost spacer portions provide increased column strength and bend resistance and better doffer column stability. The spacer increases the natural frequency, and therefore raises the critical speed, of the doffer column so that higher doffer speeds and/or longer doffer columns can be provided. In the preferred embodiment, the entire outer surface of the spacer is cylindrical and can rotate very closely to the spindle tips without interference.

These and other objects, features and advantages of the present invention will become apparent to one skilled in the art upon reading the following detailed description in view of the drawings.

BRIEF DESCRIPTION OF THE DRAWINGS

FIG. 1 is a side view of a doffer column assembly, partially in section.

FIG. 2 is an perspective view of a spacer utilized in the column assembly shown in FIG. 1.

FIG. 3 is a view taken substantially along lines 3-3 of FIG. 1.

FIG. 4 is a sectional view of an alternate embodiment of the invention showing a star shaped spacer supported on the doffer shaft.

FIG. 5 is a view similar to FIG. 4 but showing another alternate embodiment of the invention.

DETAILED DESCRIPTION OF THE DRAWINGS

Referring to FIG. 1, therein is shown a doffer column assembly 10 for the row unit of a conventional cotton picker. The doffer column structure 10 includes doffers 12 supported on an upright shaft 14 for rotation about shaft axis 15. The doffers are 12 are vertically spaced on the shaft 14 by spacers 16. The doffers 12 rotate with the shaft 14 above rows of the spindles and unwrap and remove cotton from the spindles in the row.

Each of the doffers 12 includes a generally horizontal circular metal disk or base plate 22 supporting radially outward and downwardly directed lugs 24 in a conventional manner. A round aperture 26 of diameter slightly greater than the diameter of the shaft 14 is located in the center of the base plate 22. The doffers 12 are slid into position on the shaft 14 with a spacer 16 inserted on the shaft between adjacent doffers. A main doffer nut 28 threaded onto lower end 14L of the shaft 14 against a lower bearing assembly 30, and an upper flanged bracket 32 secured to upper end 14U of the shaft 14 adjacent the uppermost doffer base plate 22, sandwich the remaining doffer base plates 22 tightly between adjacent pairs of the spacers 16. The doffers 12, shaft 14 and spacers 16 rotate together about the axis 15 of the shaft 14 as they are driven by an upper shaft portion (not shown) connected to the bracket 32 and to drive structure located within the harvester row unit housing above the doffer column assembly 10.

As shown in FIGS. 2 and 3, the spacer 16 is fabricated as a single piece from steel and includes a cylindrically shaped outer wall portion 36 having a cylindrically shaped outer surface 38 and an inner wall or surface 40 of radius substantially greater than the radius of the shaft 14. A series of axial ribs 44 spaced equidistantly around the inner surface 40 extend the length of the spacer 16. The ribs 44 have radially innermost rib surfaces 50 lying substantially on the surface of an imaginary cylinder of radius slightly greater than the radius of the shaft 14 and centered on the shaft axis 15. The ribs 44 maintain the spacer centered with respect to the rotational axis 15 on the shaft 14. Ends of the ribs, indicated at 52, provide a keying structure which bites into the doffer plates 22 and helps the spacer to grip the doffer for a more positive doffer drive.

The ribs 44 define a series of spaces or voids 54 between the shaft 14 and the inner surface 40. As can be appreciated from FIGS. 2 and 3, the ribs 44 have a volume substantially less than that of the voids 54. The voids 54 therefore substantially reduce the weight of the spacer 16. The average density of the volume between the inner wall 40 and the shaft 14 is much less than that of the outer wall portion 36. The radially outwardly extended cylindrical wall portion 36 provides extra shaft support as well as better support and gripping of the plate 22 on the doffers 12 for a more positive doffer drive. The increased diameter also increases the natural frequency of the doffer column 10 for less vibration and increased critical speed. The cylindrical shape of the outer surface 38 permits very close spacing between the spacer 16 and the spindles without interference therebetween.

Although a cylindrical wall portion 36 is preferred, other shapes could also be used, such as a thin walled star shape as shown at 16a in FIG. 4. A star shaped wall portion 36a includes an outer surface 38a and an inner surface 40a with innermost corner sections 60 defining the centering portion for locating the spacer 16a on the shaft 14. Voids 54a are defined between the corner sections 60 for reduced weight.

In another embodiment (FIG. 5), a two-piece spacer 16b includes an outer thin walled metal portion 36b with a separate low density insert 66. As shown in FIG. 5, the metal portion 36b is cylindrical in shape, and the insert 66 is made from a foam or other synthetic material and centers the portion 36b on the shaft 14. The insert 66 can be fabricated with different low density materials and can also have voids such as shown at 54 in FIGS. 2 and 3. The insert 66, which as shown is a hollow cylindrical member, is of substantially lower average density than the portion 36b.

Having described the preferred embodiment, it will become apparent that various modifications can be made without departing from the scope of the invention as defined in the accompanying claims.

I claim:

1. In a cotton harvester row unit having an upright picker drum with rows of spindles and an upright doffer column with vertically spaced doffers adapted for doffing cotton from the spindles, doffer column shaft structure comprising:
   an upright doffer shaft;
   a plurality of doffer spacers slidably received over the shaft between the doffers, the spacers having a radially innermost shaft contacting portion and a radially outermost portion with upper and lower doffer contacting portions spacing the doffers and constraining the doffers for rotation in unison;
   wherein the spacers include an interior portion between the radially outermost portion and the shaft contacting portion defining a space between the shaft and the outermost portion of the spacer; and
   wherein the interior portion includes spaced ribs extending radially inwardly from the outermost portion.

2. The invention as set forth in claim 1 wherein the ribs have innermost surfaces lying substantially on the surface of a cylinder having a radius approximately equal to the radius of the doffer shaft and defining the radially innermost shaft contacting portion of the spacer.

3. In a cotton harvester row unit having an upright picker drum with rows of spindles and an upright doffer column with vertically spaced doffers adapted for doffing cotton from the spindles, doffer column shaft structure comprising:
   an upright doffer shaft;
   a plurality of doffer spacers slidably received over the shaft between the doffers, the spacers having a radially innermost shaft contacting portion and a radially outermost portion with upper and lower doffer contacting portions spacing the doffers and constraining the doffers for rotation in unison;
   wherein the spacers include an interior portion between the radially outermost portion and the shaft contacting portion defining a space between the shaft and the outermost portion of the spacer; and
   wherein the radially outermost portion of the spacer comprises an outer cylindrical wall having an inner surface and an outer surface, the inner surface being spaced radially outwardly from the inner shaft contacting portion.

4. In a cotton harvester row unit having an upright picker drum with rows of spindles and an upright doffer column with vertically spaced doffers adapted for doffing cotton from the spindles, doffer column shaft structure comprising:
   an upright doffer shaft;
   a plurality of doffer spacers slidably received over the shaft between the doffers, the spacers having a radially innermost shaft contacting portion and a radially outermost portion with upper and lower doffer contacting portions spacing the doffers and constraining the doffers for rotation in unison; wherein the spacers include an interior portion between the radially outermost portion and the shaft contacting portion defining a space between the shaft and the outermost portion of the spacer; and
   wherein the spacers are generally star shaped with innermost corners defining the shaft contacting portion.

5. The invention as set forth in claim 3 wherein the spacers include a low density insert located in the space between the shaft and the outermost portion of the spacer.

6. A spacer for supporting cotton doffers in vertically offset relation on an upright spindle shaft of preselected radius, the spacer comprising:
   a cylindrical body having an inner wall and an outer wall, the walls having radii greater than the preselected radius of the shaft; and
   shaft support structure extending radially inwardly from the inner wall and terminating in shaft contacting surfaces lying generally on an imaginary cylindrical surface of radius approximately equal to the preselected radius to provide centralizing support of the spacer on the shaft.

7. The invention as set forth in claim 6 wherein the shaft support structure defines voids between the inner wall of the cylindrical body and the imaginary cylindrical surface.

8. The invention as set forth in claim 6 wherein the shaft support structure comprises axially extending ribs spaced around the inner walls of the cylindrical body.

9. The invention as set forth in claim 6 wherein the cylindrical body has a first average density and is fabricated from a metal and the shaft support structure has an average density less than the first average density.

10. The invention as set forth in claim 7 wherein the voids and shaft support structure define first and second volumes, respectively, the first volume being greater than the second volume to thereby provide a relatively light shaft support structure.

11. The invention as set forth in claim 8 wherein spaces are defined between the ribs, and the spaces have a volume greater than that of the ribs.

12. The invention as set forth in claim 8 wherein the spacer is of one piece construction and the axially extending ribs are integral with the cylindrical body.

13. The invention as set forth in claim 10 wherein the shaft support structure comprises projections extending radially inwardly from the cylindrical body.

14. The invention as set forth in claim 6 wherein the shaft support structure comprises an insert having an average density less than that of the cylindrical body.

15. The invention as set forth in claim 6 wherein the shaft support structure includes keying structure adapted to bite into the doffers to help prevent relative rotation between the spacer and the doffers.

16. The invention as set forth in claim 1, wherein the shaft support structure includes axially extending ribs having ends which define the keying structure.

* * * * *